United States Patent [19]

Johnson

[11] Patent Number: 5,209,616

[45] Date of Patent: May 11, 1993

[54] DRIVE IN TAPPING ATTACHMENTS

[75] Inventor: Allan S. Johnson, Newport Beach, Calif.

[73] Assignee: Tapmatic Corporation, Irvine, Calif.

[21] Appl. No.: 724,547

[22] Filed: Jun. 27, 1991

[51] Int. Cl.$^5$ .............................................. B23B 47/14
[52] U.S. Cl. ...................................... 408/139; 192/21; 192/51; 408/132; 470/181
[58] Field of Search ............... 408/134, 139, 141, 142; 10/89 F, 136 R, 136 TS, 141 H; 192/21, 51, 44, 45; 470/181, 182

[56] References Cited

U.S. PATENT DOCUMENTS

| | | | |
|---|---|---|---|
| 3,656,858 | 4/1972 | Ericksson | 408/139 |
| 3,946,844 | 3/1976 | Johnson | 408/139 |
| 3,999,642 | 12/1976 | Johnson | 408/139 |
| 4,832,542 | 5/1989 | Johnson et al. | 408/139 |

Primary Examiner—Daniel W. Howell
Attorney, Agent, or Firm—Joseph R. Evanns

[57] ABSTRACT

In self-reversing tapping attachments improved ball drive means are connectable to source of rotational drive and drive transmitting means are engagable, with the drive means including at least one driving ball member and with the drive transmitting means defining at least one slot for the ball member, which slot includes a ramp section inclined so that upon engagement between the drive means and the ball member the latter travels upwardly thereby cushioning impact between the drive means and the drive transmitting means. A radially extending member on a tap holder member has a radius of curvature less than the radius of curvature of contact members of the drive transmitting means to cushion impact.

10 Claims, 3 Drawing Sheets

DRIVE IN TAPPING ATTACHMENTS

BACKGROUND OF THE INVENTION

1. Field of the Invention

The field of the invention is that of driver elements in self-reversing tapping attachments, which are tools that carry taps for threading holes and are driven by an external drive source such as a driving machine, drive being imparted from a movable body in the tapping attachment body to a member carrying the tap and the tapping attachment including means for reversing the rotation of the tap.

2. Description of the Prior Art

Related patents to the same inventor as named on the application herein are U.S. Pat. Nos. 3,397,588; 3,472,347; 3,717,892; 3,946,844; 3,999,642; 4,014,421; 4,029,429; 4,067,424; and 5,011,344. The above-cited patents relate, among other things, to clutching arrangements in tapping attachments, both for direct drive and for reverse drive.

Existing tapping attachments are many and varied, and constitute a relatively mature art. Within the relatively recent past, however, there has arisen a need for improvements in tapping attachments due to the advent of high speed tapping that is, tapping at high rpm. A need for improvement in tapping attachments for high speed application is particularly pronounced with respect to self-reversing tapping attachments, i.e., tapping attachments which provide for a reverse rotation of the tap in order to aid its withdrawal from a hole which has been threaded by it.

A common device for imparting drive to a drive member of a tapping attachment in existing devices is the ball drive. In a ball drive, a driver member impacts with driver balls held in or associated with a driving element which in turn impacts with a dog or like member for the purpose of imparting drive, either forward or reverse, to a tap holder in the form of a spindle.

In existing ball drive arrangements, particularly in high speed applications, impacts between the balls and the various dogs and splines with which they engage for the purpose of imparting drive, result in shock and vibration, together with substantial wear of the machine elements.

The need for drive elements of tapping attachments able to withstand high performance conditions is particularly pronounced in regard to Computer Numeric Control (CNC) applications. Under CNC operation, time is particularly of the essence for withdrawing a tap from a hole which it has threaded in that the CNC operation provides for a computer controlled transfer of driving force from one tap attachment to another, timely removal of a previously used tap from a hole being critical in such an operation.

Therefore, there has been a felt but unfulfilled need for a driving arrangement in a tapping attachment whereby in a ball drive, shock and wear within the driving and clutching elements are minimized, in particular for high speed applications.

SUMMARY OF THE INVENTION

In a self-reversing tapping attachment, an improvement is provided comprising drive means connectable to a source of rotational drive and drive transmitting means engageable with the drive means and including at least one driving ball member, the drive transmitting means defining at least one slot for the at least one ball member, the slot including a ramp section inclined such that on engagement between the drive means and the at least one ball member, the latter travels upwardly, whereby impact between the driving means and the drive transmitting means is cushioned. A radially extending member on a tap holder member has a radius of curvature less than the radius of curvature of contact members on the drive transmitting means.

DESCRIPTION OF A PREFERRED FORM OF THE INVENTION AND PREFERRED METHOD OF PRACTICE.

Figure 1:
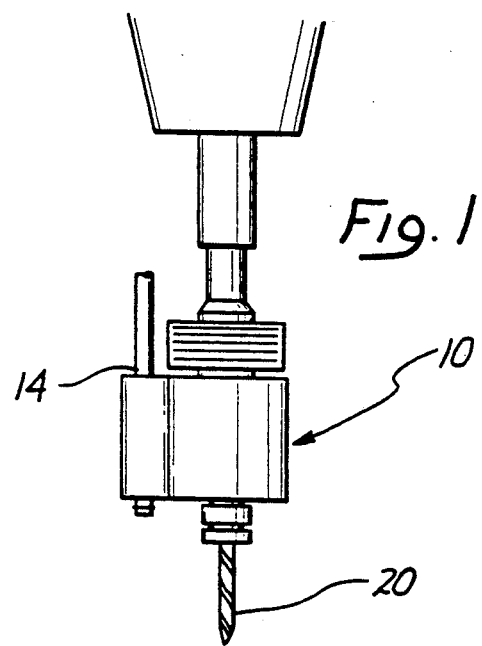
FIG. 1 is a side view somewhat simplified, of a tapping attachment in accordance with the invention being driven by a driving machine.

As depicted in FIG. 1, a tapping attachment 10 is connected to a source of rotational drive in the form of a driving machine 12. A holding stem 14 (shown fragmentally only) is at a side of the housing 16 of the tapping attachment 10 and is connectable in conventional fashion to the driving machine 12 to form a restraint preventing rotation of the housing 16 of tapping attachment 10.

A spindle member 18 extends outwardly of housing 16. At its upper end, spindle member 18 extends to driving machine 12. At the lower end of spindle member 18 a tap 20 is attached, the tap 20 being threaded so as to make threaded holes in work pieces (not shown) and including a central bore (not shown).

Whereas the housing 16 is held stationary against rotation, a movable component 22 of tapping attachment 10 is connectable to driving machine 12 to be rotatable to provide drive to the tap 20, as described more fully hereinbelow.

Referring now to FIGS. 2-5, inclusive, the moveable part 22 of tapping attachment 10 defines a central bore 24, with the spindle member 18 therein. An insert 29 containing a conduit 26 is contained within central bore 24, and around the periphery of the conduit 26 at a lower portion thereof is disposed a resilient sleeve 27. Insert 26 forms a conduit for passage of coolant therethrough and through tap 20 for the purpose of cooling the tap and clearing debris in the form of cuttings,. and the like from the work piece. Resilient sleeve 27 is provided for the purpose of affording the capability of axial movement of the conduit 26 in connection with axial movement of movable member 22 on the occasion of a shift between forward and forward drives as described in more detail hereinbelow.

Within housing 16 is a forward drive member 30, of generally annular configuration defining a central bore 38 and fitting within housing 16. Forward drive member 30 carries on its radially inward wall at least one forward drive spline member 36. Forward drive spline member 36 is connected with a neutral area shoulder 37 located axially downwardly thereof (i.e., toward the lower end of the spindle member 18 where the tap 20 is held).

Positioned radially inwardly from forward drive member 30 in the depicted forward drive configuration is drive transmitting means in the form of a drive sleeve member 40. Drive sleeve member 40 has generally annular configuration defining a central bore 42. Extending radially inwardly from the peripheral inner wall of member 40 is an inner drive spline member 44. Driver sleeve member 40 defines at its periphery at least two slots 46, 48 for accommodation and movement therein of drive balls 32, 33, respectively. In the forward drive mode depicted forward drive member spline 36 is engaged with ball member 32.

Slots 46, 48, respectively, are of generally ellipsoidal configuration. Stated in other terms, slots 46, 48 may be described alternatively as rhomboidal quadrilaterals having opposite sides generally parallel but instead of vertices with acute and oblique angles, with ends where the vertices would be, being of arcuate configuration. A first ramp member 50 and a second ramp member 52 constitute inclined sides of the lower part of slot 46. Under the depicted configuration of slot 46, the opposite side to the side which comprises ramp 50 is generally parallel to ramp 50 and is designated by the reference numeral 54. Similarly, the side opposite to the side constituting ramp 52 is generally parallel thereto and is designated by reference numeral 56.

Also disposed within housing 16 is reverse drive member 58. At the upper inner periphery of reverse drive member 58 is defined a neutral region in the form of a shoulder 60. Connected to neutral region 60 is reverse drive spline member 62 disposed axially downwardly from neutral region 60. Reverse drive member 58 defines a central bore designated as 64, and has a generally annular configuration.

Inner drive sleeve spline 44 on driver sleeve 40 comprises a generally arcuate contact area 66. Connected to contact area 66 is a generally arcuate intermediate region 68, and connected thereto is a second contact surface 70 configured in the same manner as the first contact surface 66. The interior of drive sleeve spline 44 with the radially inward wall of drive spline 44 and the drive spindle disposed adjacent thereto, in effect, constitute two slots 72, 74.

Carried on drive spindle member 18 in a slot 76 defined therein and intermediately thereof along the axial extent is at least one drive pin 78. Pin 78 is generally cylindrical in configuration with a substantially circular cross-section. In accordance with the invention, the radii of curvature of the contact surfaces 66, 70 of inside drive spline 44 are larger than the radius of curvature of drive pin 78. In particular applications, such radii of curvature of the contact surfaces 66, 70 may exceed the radius of curvature of drive pin 78 by 10-25%.

Spindle member 18 has an enlarged section 80 at its lower end. Defined at the lower end 80 of spindle 18 are threaded screw holes 82, 84. In screw holes 82, 84 are screw members 86, 88, the ends of which fit into sockets in the sidewalls of a tap holder 90 (shown fragmentarily only), whereby the latter is held in position relative to spindle member 18.

A quick change mechanism 92 is disposed at the end of tap holder 90 and enables ready change from one tap to another (not shown). Quick change mechanism 92 includes a ring member 94 with contained coil spring member 96.

In the sidewall of tap holder 90 near the end thereof are oppositely disposed bores 98, 100, for radial pins 102, 104 held in position by ring member 94.

In operation, rotation is transmitted from the driving machine 12 to the forward drive member 30 and the reverse drive member 58, which are connected to movable member 22 by conventional means (not shown) in the tapping attachment 10, reverse drive member 58 being also connected through conventional gearing (not shown), such as is disclosed in co-pending application Ser. No. 07/330,752 filed Mar. 30, 1989, now abandoned, and related continuation-in part application Ser. No. 07/715,343 filed Jun. 14, 1991 to the same inventor as the instant application and incorporated by reference herein.

Figure 3:
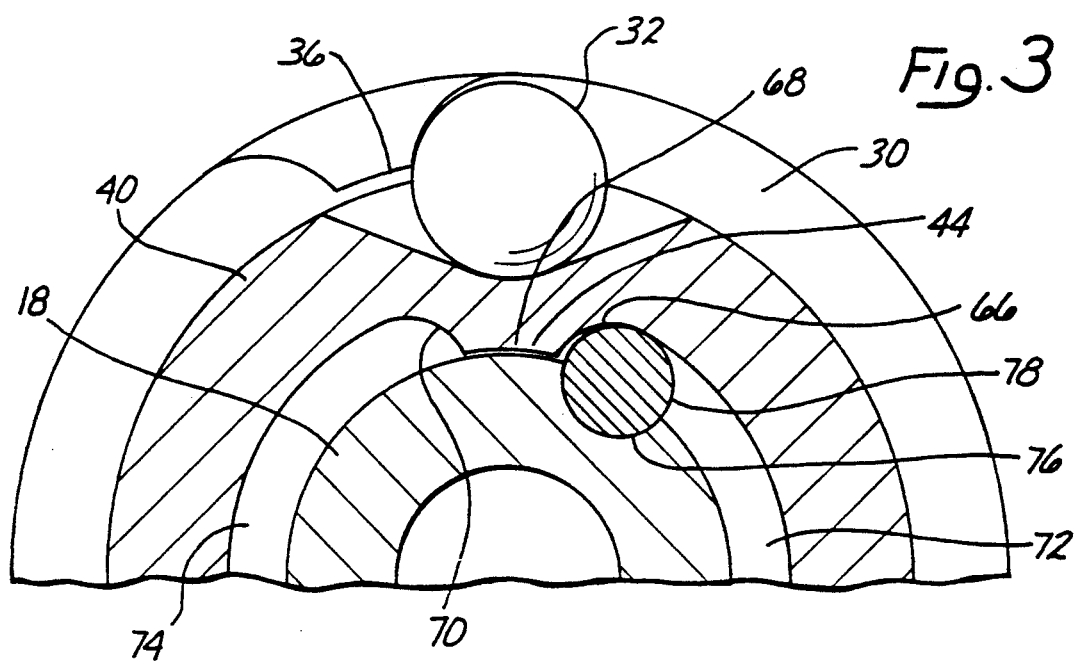
FIG. 3 is a cross-sectional view, along the line A—13 A, depicting a driving arrangement in accordance with the invention.
Figure 2:
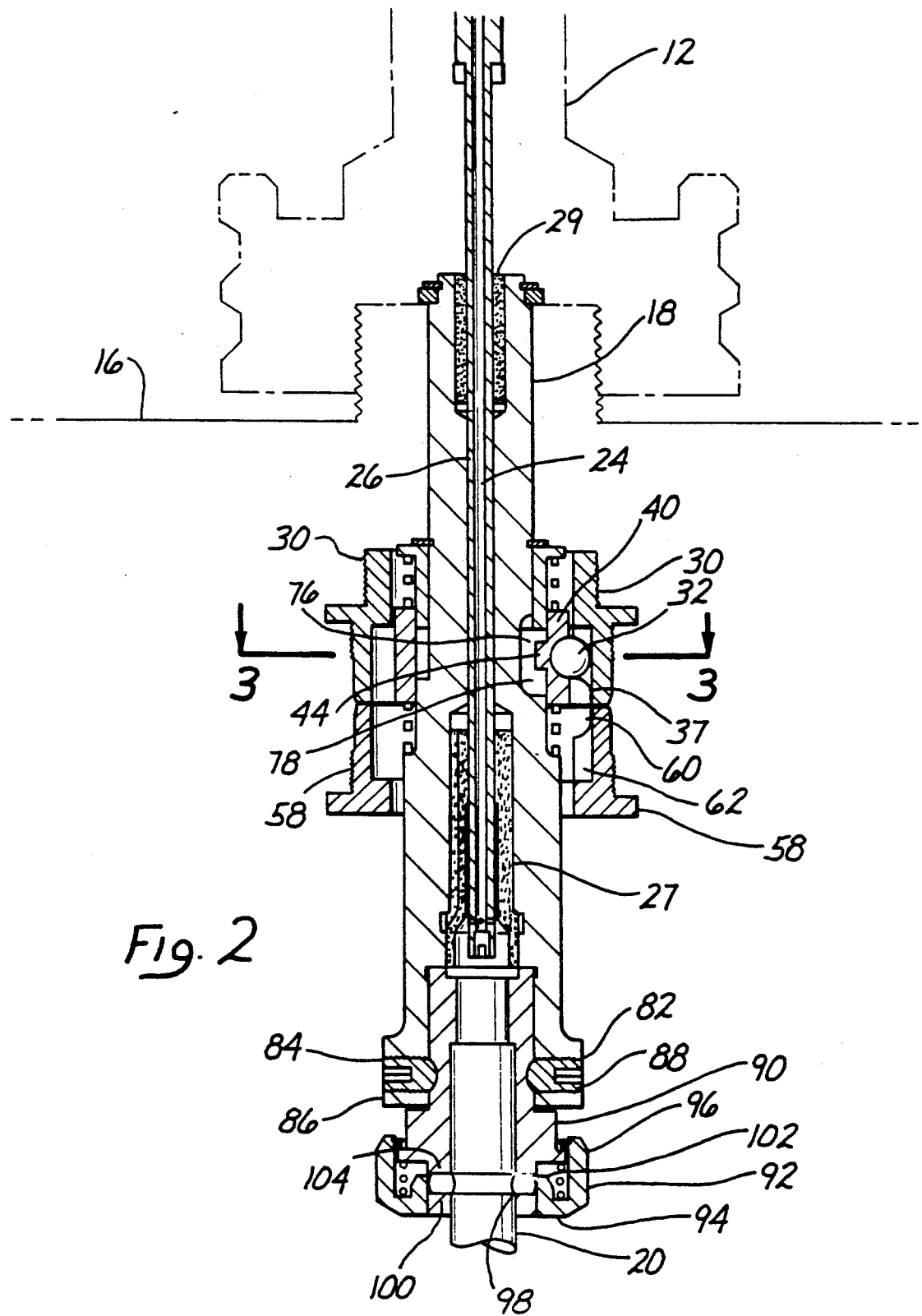
FIG. 2 is a cross-sectional view, somewhat simplified of a tapping attachment including a preferred form of the invention.
Figure 4:
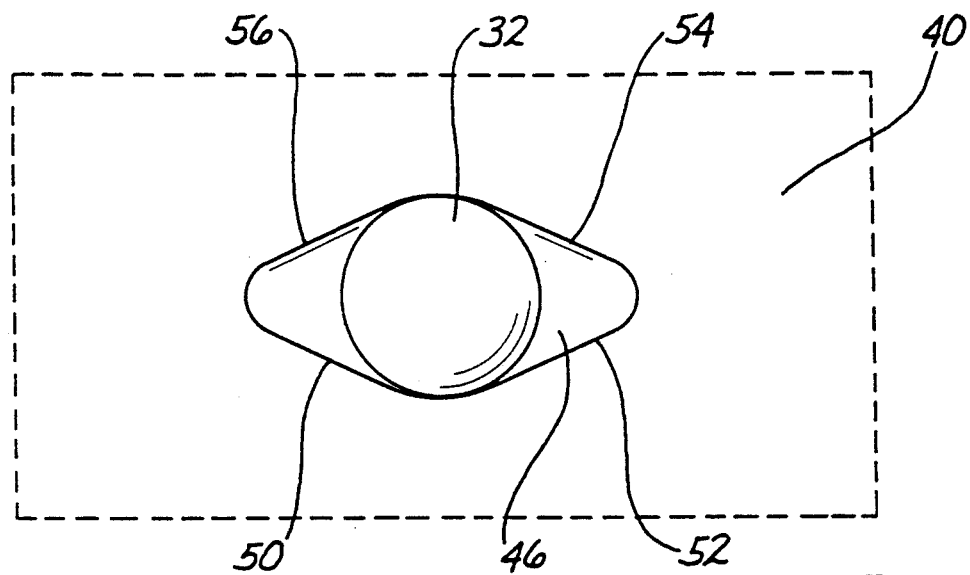
FIG. 4 is a detail view of a driving arrangemnt in accordance with the invention.
Figure 5:
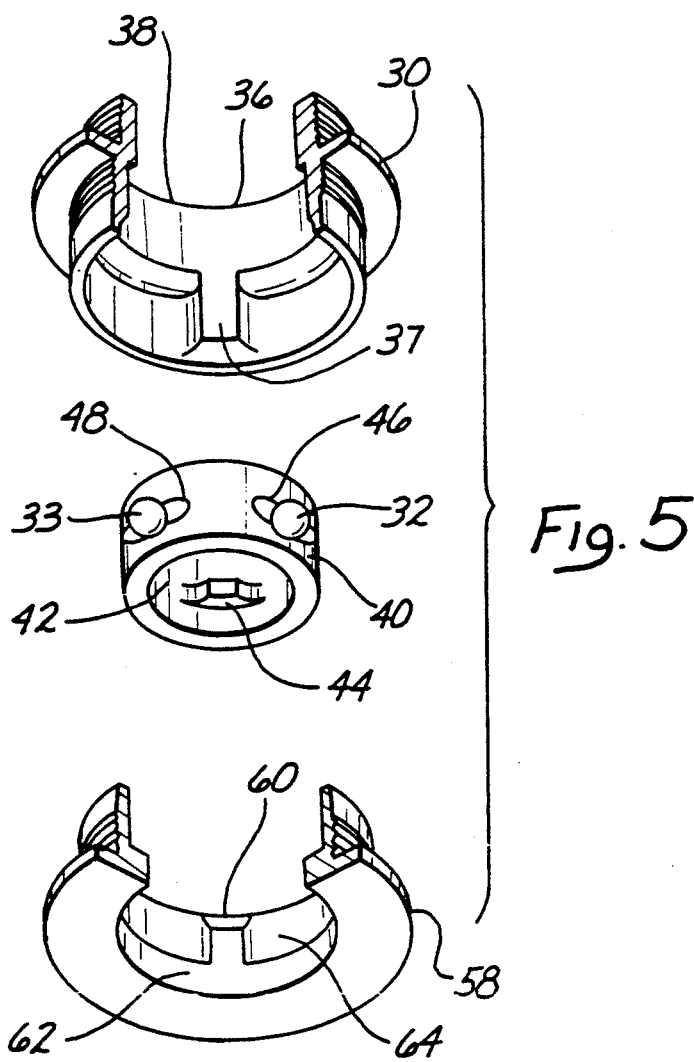
FIG. 5 is a side view of a part of a driving arrangement in accordance with the invention.

In forward drive, the forward drive spline 36 on forward drive member 32 engages with balls 32, 33 of driving sleeve 40 as depicted in FIG. 3. Such engagement comprises in effect a collision between the spline 36 and the balls 32, 33. In accordance with the invention, and as a result of the ellipsoidal shape of slots 46, 48, the driving balls 32, 33 experience less shock and wear than in existing devices. Upon impact, the driving balls 32, 33 are urged up the ramp structures 50, 52, thereby providing a buffered or cushioned impact between the spline 36 and the balls 32, 33. Due to the configuration of the slot 46, impact in either direction is accommodated in the described manner.

Upon engagement of the drive spline 36 with balls 32, 33 as described above, drive sleeve 40 is urged in the forward rotational direction and as a result, inner drive spline 44 is urged toward drive pins 78 on drive spindle 18. Due to the greater radius of curvature of the engagement surfaces 66, 70 of the drive sleeve 40 as opposed to the radii of curvature of drive pins 78, the impact between inner drive spline 44 and its contact surface at 66, 70 with drive pin 78 is less abrupt and sharp than in the case where the radii of curvature were the same. In addition contact between surfaces 66, 70 and pins 78 is linear as opposed to point contact, thus distributing the impact and reducing shock and wear. Therefore, excessive shock and wear on the drive spline 44 of the drive sleeve 40 as well as on the drive pins 78, are avoided.

Coolant is provided during tapping from the driving machine 12 via the conduit 26. When the hole has been threaded to the selected depth and the tap is to be withdrawn from the hole, the tapping attachment 10 is raised by the driving machine 12. At this point, the tap is embedded in the hole and removal is most conveniently accomplished by reversing the tap rotation.

Accordingly when the tapping attachment is raised the spindle 18 and tap 20 remain in the hole, the forward drive member 32 and reverse drive member 58 moving axially upwardly relative to the spindle member 18 and tap 20.

As a result of the aforesaid axially upward movement balls 32, 33 travel along the neutral range shoulders 37, 60 until the reverse drive member 58 and rear drive spline 64 engage balls 32, 33 in driving engagement, thereby causing reverse rotation of the spindle 18 and tap 20, enabling efficient withdrawal of the tap 20 from the hole. As in forward drive, driving engagement is cushioned due to the configuration of slots 46, 48, the cylindrical shape of drive pins 78, and the greater radii of curvature of contact member 66, 70 vis a vis the radii of curvature of drive pins 78.

Therefore, there have been described ball drive tapping attachments which provide for driving engagement with reduced shock and wear to driving parts thereby increasing efficiency and longevity.

The foregoing is descriptive and illustrative, the invention being defined only by the appended claims interpreted in light of the specification.

What is claimed is:

1. In a self-reversing tapping attachment, the improvement comprising:

drive means connectable to a source of rotational drive; and drive transmitting means engagable with said drive means and including at least one driving ball member, said drive transmitting means defining at least one slot for said at least one ball member, said slot including a ramp section inclined such that on engagement between said drive means and said at least one ball member, said ball member is urged upwardly in a direction toward the said source of rotational drive, whereby impact between said driving means and said drive transmitting means is cushioned.

2. The invention as set forth in claim further including holding means for holding a tap, said means for holding a tap comprising an axially extending member carrying at least one substantially radially extending member for engaging with contact means carried by said drive transmitting means.

3. The invention as set forth in claim 2 wherein said substantially radially extending member comprises at least one pin member having at least one portion thereof for contacting said drive transmitting means, wherein said drive transmitting means includes at least one driver element for contacting said at least one pin member of said tap holder means, and wherein said portion of said at least one pin member for contacting said at least one driver element is arcuate having a radius of curvature, and wherein said at least one driver element on said drive transmittal means is arcuate having a radius of curvature larger than the radius of curvature of said at least one pin member, thereby to cushion impact between said at least one pin member and said at least one driver element and reduce shock and wear on said at least one driver element and said at least one pin member.

4. The invention as set forth in claim 3 wherein said radius of curvature of said driver element exceeds the radius of curvature of said at least one pin member in the range of 10–25 percent.

5. The invention as set forth in claim 1 wherein said driving means comprises a forward drive member and a reverse drive member and wherein said driver members are movable axially with respect to said drive transmittal means and said tap holder means whereby to reverse the direction of rotation of said tap holder member.

6. The invention as set forth in claim 1 wherein said slot for said at least one ball member is substantially ellipsoidal in shape.

7. An improvement in tapping attachments utilizing ball drive comprising:

driving means connectable to a source of rotational drive;

drive transmitting means engagable in driving engagement with said driving means, said drive transmitting means including at least one driving ball member for driving engagement with said driving means;

tap holding means engagable in driving engagement with said drive transmitting means, said tap holding means including at least one extending member for driving contact with said drive transmitting means such that driving contact will be at two or more points, said at least one driving ball member being movable on inclined means upon driving contact such that driving contact between said at least one ball member and said driving means is cushioned.

8. The invention as set forth in claim 7 wherein said means on which said at least one driving ball member is movable is configured such that upon driving contact between said driver means and said at least one driving ball member, said at least one driving ball member is impelled along an incline.

9. The invention as set forth in claim 7 wherein said drive transmitting means includes at least one contact member for driving engagement with said at least one extending member on said tap holder means, said at least one contact member having a first radius of curvature, and said at least one extending member on said tap holder means having a second radius of curvature, said first radius of curvature being greater than said second radius of curvature, whereby impact between said at least one extending member on said tap holder means and said at least one contact member is cushioned.

10. The invention as set forth in claim 7 wherein said means upon which said at least one ball member is movable comprises slot means of substantially ellipsoidal configuration.

* * * * *